Aug. 5, 1958     W. E. GREENAWALT     2,846,302
SMELTING FINELY DIVIDED IRON ORE PROCESSES
Filed Feb. 11, 1957
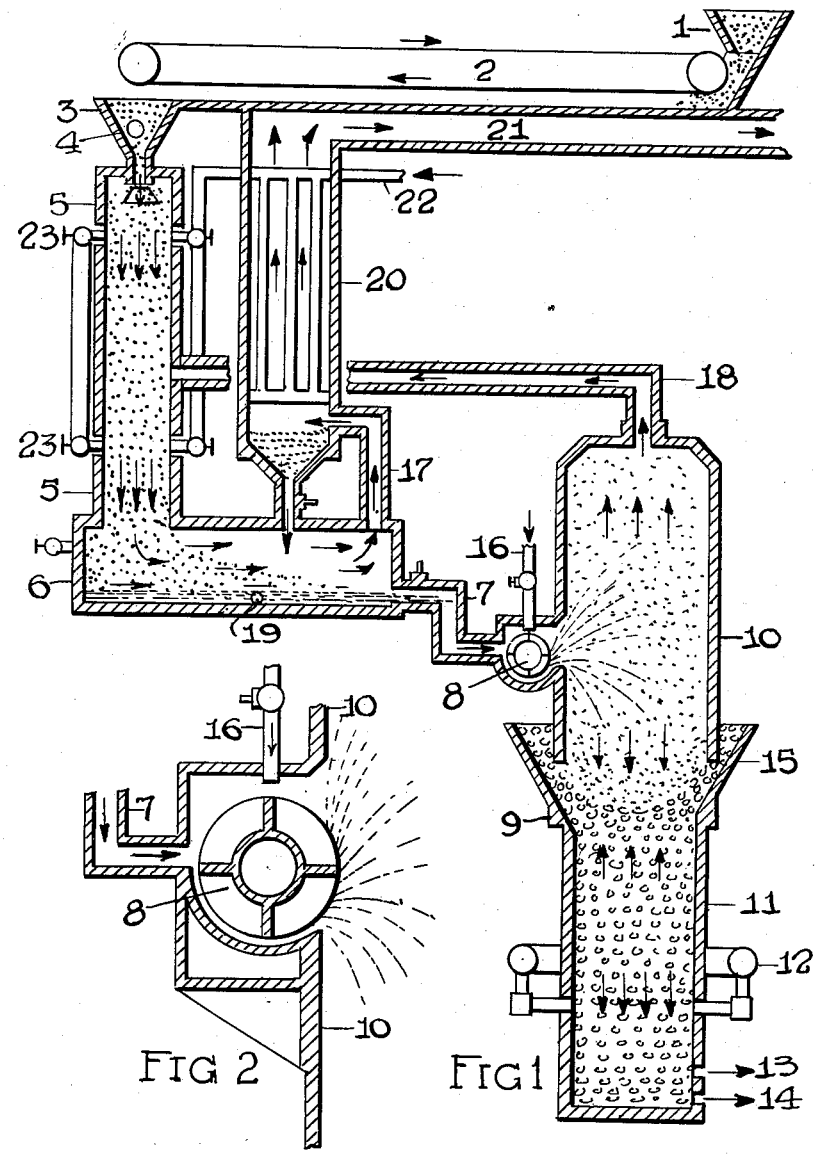
INVENTOR.
William E. Greenawalt

2,846,302

SMELTING FINELY DIVIDED IRON ORE PROCESSES

William E. Greenawalt, Denver, Colo.

Application February 11, 1957, Serial No. 639,399

8 Claims. (Cl. 75—40)

My invention relates to smelting finely divided iron ore, principally obtained from milling ore too low in grade to be advantageously smelted direct.

Iron ore concentrate, usually obtained by gravity, flotation, or magnetic separation of finely ground low grade ore is ordinarily obtained by repeated fine grinding, and is prepared for blast furnace melting by pelletizing and sintering, which converts it into semi-fused lumps. This is done by mixing the finely ground ore or concentrate with about ten percent water and several percent of fine coke, igniting the charge, and passing a blast of air downwardly through the porous mixture. The or, in sintering, is heated to about 2100° F., after which it is cooled to atmospheric temperature of about 65° F. When the cold sinter is charged into the blast furnace it has to be reheated through the sintering temperature of about 2100° F. to the smelting temperature of 2800 to 3000° F. This involves a heavy expense of both installation and operation. It is evident that if direct smelting of the fine concentrate could be sufficiently cheapened it would be practical to economize in the milling by avoiding very fine grinding, and dispense with pelletizing and sintering to put the concentrate into shape for regular blast furnace smelting.

It has been repeatedly proposed to get these results by showering the finely ground ore or concentrate through a highly heated reducing atmosphere of a vertical shaft smelting furnace, but the difficulties involved have not met with encouraging results in practical operations.

The object of my process is to cheapen the milling, avoid sintering, and dispensing with hot blast stoves in regular blast furnace practice.

The process is applicable to any finely divided iron ore, but will be described to concentrate produced by flotation, gravity, or magnetic separation, in milling low grade ores, and to large deposits of low grade ores which are not satisfactorily concentrated direct by any of these milling methods.

Referring to the accompanying drawing: The finely ground ore, usually wet or moist, is delivered into the receiving bin 1, from which it is fed in a regulated stream into the drier 2, and delivered into the receiving bin 3; and from there fed, by means of the feeder 4, into the melting furnace 5, in which it descends in showered form through the highly heated, atmosphere of the melting furnace to melt it. The mixture of molten iron ore and hot melting furnace gas flows in a continuous stream into an enclosed chamber 6 where the melting furnace gas is separated from the molten ore. The molten ore, separated from the melting furnace gas, flows through the duct 7 into a rotary mechanism 8, operating at high speed, which ejects the molten ore as a spray into the highly heated reducing atmosphere in the upper part 10 of a vertical shaft smelting furnace 9. The smelting furnace is divided vertically into an upper section 10 containing highly heated reducing gas, and a lower section 11 filled with coal or coke in permeable lump form, and heated with air delivered into it by means of the tuyeres 12. The carbon is fed into the lower part of the smelting furnace 11 through the feeders 15. The reduced molten ore accumulates in the smelting furnace hearth into layers of pig iron and slag. The slag is removed through the slag hole 13, and the pig iron through the tap hole 14.

The column, or mass, of carbon in the smelting furnace is heated to about the same temperature and in much the same way as in regular iron blast furnace smelting, or 2600 to 3000° F. at the bosh and tuyere zone. The gas issuing from it is delivered into the spray, or upper section of the smelting furnace at a correspondingly high temperature and rich in carbon monoxide. But this hot gas will not usually be large enough in volume or concentrated enough for effective reducing operations in the spraying section of the smelting furnace. A fluid reducing agent, such as powdered coal, petroleum, or natural gas, may be injected into it to meet the reduction requirements. Air is not necessary for reduction if the temperature is high enough and the reducing agent is concentrated enough.

For the present description the ordinary procedure of introducing air through tuyeres, as in iron blast furnace smelting is assumed, and the resulting hot gas, rich in carbon monoxide, flows from the lower section of the smelting furnace into the sprayed ore in the upper section. Additional reducing agents may be introduced into the upper section anywhere if and when necessary. But it is preferred to introduce part or all into the rotary mechanism 8, through the pipe 16. This gives a thorough mixture of molten ore and reducing agent in the rotor, and the mixture of molten ore and reducing agent is injected into the upper section of the smelting furnace. Air may also be introduced in this way if so desired to give the necessary heat incident to the chemical reduction reactions.

The hot gas, rich in carbon monoxide, issuing from the top of the smelting furnace 9 flows through the duct 18 into the melting furnace oxidizing atmosphere, where the carbon monoxide is burned to furnish part of the heat necessary to melt the ore. Hot air, or additional fuel or reducing agent may be introduced into the melting furnace through the burners 23. The melting furnace will usually be operated with an oxidizing atmosphere at the top to facilitate the heating, and with a reducing agent at the bottom to facilitate the reduction. If so operated the resulting molten ore will consist of a mixture of reduced and unreduced iron oxide, and their relative proportions may be regulated as desired.

The hot melting furnace gas issuing from the gas separating chamber 6 flows through the duct 17 into a heat exchanger 20, where most of the dust is settled out, and fresh air is heated, through the pipes 22, which may be used anywhere in the general process.

The process effects an important relation between milling and smelting, because it will not be necessary or desirable to grind all of the ore to an extreme or to a uniform fineness. A small amount of unmelted particles, either reduced or unreduced, may flow through the circuit into the mass of carbon in the lower part 11 of the smelting furnace 9, where the high temperature and concentrated carbon and carbon monoxide will complete the reduction to pig iron and slag. If, for example, the ore is ground to 20 mesh, only about 12% would be the full mesh size; 25% would be between 40 and 50 mesh; 23% would be between 60 and 100 mesh; and 40% would be over 100 mesh. The 63% of the ore finer than 60 mesh would be instantly melted in tthe highly heated oxidizing atmosphere in the upper part of the melting furnace 5 and instantly reduced in the highly heated reducing atmosphere in the lower part of the melting furnace. The molten ore consisting of 63% reduced and 37% unreduced iron oxide, is delivered in sprayed form, by means of the rotor 8, into the upper section 10 of the smelting furnace 9, where all but a very small portion of the ore is reduced in suspension, and is distributed in sprayed form over the entire upper surface of the highly heated column of carbon, and percolates downwardly in disseminated form in intimate contact with the highly heated carbon to complete the conversion of the iron into pig iron and slag. By regulating the temperature and the height of the melting furnace it would be practical to smelt ore ground no finer than 10 or 12 mesh, which implies an appreciable saving in milling.

The only coke consumed in the smelting furnace would be that required to raise the temperature of the molten ore from 2300° F. to the smelting temperature of 2800–3000 degrees, and provide the carbon for the reducing reactions of the unreduced ore.

The smelting furnace acts as a medium to reduce the unreduced ore and to slag the impurities of all of it. The temperature of the carbon at the top of the smelting furnace may be kept as high as desired above the melting point of the ore, and may be varied to conform with the amount of the unreduced coarse ore delivered into it from the melting furnace. It serves as a firebox for the smelting furnace, into which the molten ore in showered form is delivered, freed from thte melting furnace gas, direct into the fire. This implies a highly heated and highly concentrated exhaust smelting furnace gas, containing a high percentage of CO. Only a small amount of reducing agent need be added to the smelting exhaust gas to control the reduction action on the finest ore particles in the lower section of the melting furnace. The grinding mesh in the mill will be largely determined by it.

The coke consumed in tthe process is used to better advantage than in regular blast furnace smelting. The blast furnace reactions may be represented by the equations:

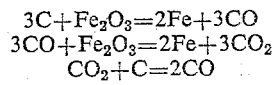

$$3C + Fe_2O_3 = 2Fe + 3CO$$
$$3CO + Fe_2O_3 = 2Fe + 3CO_2$$
$$CO_2 + C = 2CO$$

The conversion of inert $CO_2$ to the active CO depends largely on the temperature and the concentration of the gas. This reaction is promoted to its highest efficiency in the smelting furnace charged with highly heated coke, and supplied with molten ore at a temperature of about 2300° F.

The amount of gas issuing from the smelting furnace is very small and contains a high percentage of CO. It flows in a uniformly distributed stream into the upper or spraying section 10 of the smelting furnace, and from there, through the duct 18, into the melting furnace. The dust which settled out in the heat exchanger is delivered in mass back to the gas separating chamber, where it is fused, and is injected, with the molten ore, into the upper section 10 of the smelting furnace.

The rotor 8 is hollow, and rotates at a high speed to make a spray fine enough to be readily reduced in the smelting furnace 9. Air can be circulated through the rotor to keep its temperature safely below the meltnig point of a high heat resisting iron alloy without perceptibly chilling the ore. The molten ore will usually be at a fairly low temperature of 2000–2200° F., which permits a safe margin for practical operation. The rotor, being mounted in water cooled bearings outside of the smelting furnace, can be replaced without seriously interfering with the smelting operation.

The process is applicable to other ores, such as copper sulphide concentrates containing a high percentage of iron. In which case the sulphide ore, usually containing 25% to 35% iron, is melted and oxidized in the melting furnace 5. The resulting copper matte collects in the bottom of the gas separating chamber 6, and is drawn off through the tap hole 19. The slag, separated from the melting furnace gas and freed from copper, then becomes the same as regular molten iron ore, and flows through the duct 7 to the rotor 8 where it is sprayed into the upper section of the smelting furnace 9, and is delivered in showered form into the highly heated carbon in the lower section 11 of the smelting furnace, where the smelting is completed to produce pig iron. The only heat required is that to raise the temperature of the molten ore one or two hundred degrees, and the only carbon required is that to reduce the oxidized iron.

I claim:

1. A process of smelting iron ore comprising, premelting the ore, separating the molten ore from the melting furnace gas, spraying the molten ore, separated from the melting furnace gas, into a highly heated reducing atmosphere in the upper section of a vertical shaft smelting furnace through its side walls to produce a mixture of reduced and unreduced molten ore while in suspension, separating the resulting reducing gas from the reduced and unreduced molten ore, delivering the mixture of reduced and unreduced molten ore in sprayed form into a highly heated permeable column of carbon in a smelting furnace in the lower section of the vertical shaft to complete the conversion of the iron oxide into metallic iron and slag, and separating the metallic iron from the slag 2. A process of smelting finely divided iron ore comprising, showering the ore through the highly heated atmosphere of a melting furnace to melt it, flowing the mixture of molten ore and melting furnace gas in a continuous stream from the melting furnace, separating the molten ore from the melting furnace gas, spraying the molten ore, separated from the melting furnace gas, into a highly heated reducing atmosphere in the upper section of a vertical shaft smelting furnace through its side walls to produce a mixture of reduced and unreduced molten ore while in suspension, separating thte resulting reducing gas from the reduced and unreduced molten ore, delivering the mixture of reduced and unreduced molten ore in sprayed form into a highly heated permeable column of carbon in lump form in a smelting furnace in the lower section of the vertical shaft to complete the conversion of the unreduced iron into metallic iron and slag, and separating the metallic iron from the slag.

3. A process of smelting finely divided iron ore comprising, showering the ore through the highly heated atmosphere of a melting furnace to melt it, flowing the mixture of molten ore and melting furnace gas in a continuous stream from the melting furnace, separating the molten ore from the melting furnace gas, spraying the molten ore mixed with a fluid reducing agent into a highly heated reducing atmosphere in the upper section of a vertical shaft smelting furnace through its side walls to produce a mixture of reduced and unreduced molten ore while in suspension, separating the resulting reducing gas from the reduced and unreduced molten ore, delivering the mixture of reduced and unreduced molten ore in sprayed form into a highly heated permeable column of carbon in lump form in a smelting furnace in the lower section of the vertical shaft to complete the conversion of the unreduced iron into metallic form, and separating the metallic iron from the slag.

4. A process of smelting finely divided iron oxide ore comprising, showering the ore through the highly heated atmosphere of a melting furnace to melt it, flowing the mixture of molten ore and melting furnace gas in a continuous stream from the melting furnace, separating the molten ore from the melting furnace gas, spraying the molten ore into a highly heated reducing atmosphere in the upper section of a vertical shaft smelting furnace through its side walls to produce a mixture of reduced and unreduced molten ore while in suspension, separating the resulting reducing gas from the reduced and unreduced molten ore, delivering the mixture of reduced and unreduced molten ore in sprayed form into a highly heated permeable column of carbon in lump form in a smelting furnace in the lower section of the vertical shaft to complete the conversion of the iron oxide into metallic iron and slag, delivering the hot reducing gas from the smelting furnace into the melting furnace, and separating the molten iron from the molten slag.

5. A process of smelting finely divided iron ore comprising, premelting the ore, separating the molten ore from the melting furnace gas, spraying the molten ore, separated from the melting furnace gas, into a highly heated reducing atmosphere to produce a mixture of reduced and unreduced molten ore while in suspension, separating the resulting reducing gas from the mixture of reduced and unreduced molten ore, then passing the mixture of reduced and unreduced molten ore through a highly heated mass of carbon to complete the conversion of the iron oxide to metallic iron, and separating the molten iron from the molten slag.

6. A process of smelting finely divided ore containing iron and copper sulphides comprising, showering the ore through the highly heated atmosphere of a melting furnace to melt it, to oxidize the iron of the sulphides, and to convert the copper of the sulphides into copper matte, withdrawing the mixture of molten ore, copper matte, and melting furnace gas in a continuous stream from the melting furnace, separating the melting furnace gas from the mixture of molten ore and copper matte, separating the copper matte from the molten iron oxide and slag, spraying the mixture of iron oxide and slag, freed from copper matte and melting furnace gas, into a highly heated reducing atmosphere of a smelting furnace to produce a mixture of reduced and unreduced iron and slag, and continuing the smelting to complete the conversion of the unreduced iron into metallic iron and slag, and separating the molten iron from the molten slag.

7. A process of smelting finely divided ore containing iron and copper sulphides comprising, melting the ore to oxidize the sulphur with the simultaneous production of copper matte, iron oxide, and slag, separating the copper matte from the iron oxide and slag, spraying the mixture of molten iron oxide and slag, freed from the copper matte, into a highly heated reducing atmosphere in a smelting furnace to produce a mixture of reduced and unreduced iron and slag, passing the mixture of reduced and unreduced iron and slag in sprayed form through a highly heated mass of carbon to complete the conversion of the iron oxide into metallic iron, and continuing the smelting to separate the molten iron from the molten slag.

8. A process of smelting finely divided ore containing iron and copper sulphides comprising, melting the ore to oxidize the sulphur with the simultaneous production of copper matte, iron oxide, and slag, separating the copper matte from the iron oxide and slag, spraying the mixture of molten iron oxide and slag freed from the copper matte into a highly heated reducing atmosphere in a smelting furnace to produce a mixture of reduced and unreduced iron and slag, passing the mixture of reduced and unreduced iron and slag in sprayed form through a highly heated mass of carbon to complete the conversion of the iron oxide into metallic iron, separating the molten iron from the molten slag, and delivering the exhaust gas from the smelting furnace into the melting furnace.

No references cited.